US006589004B2

(12) United States Patent (10) Patent No.: US 6,589,004 B2
Reed (45) Date of Patent: Jul. 8, 2003

(54) ALL TERRAIN VEHICLE LIFT

(76) Inventor: Dennis W. Reed, 2745 McKinstry Rd., Moscow, TN (US) 38057

( * ) Notice: Subject to any disclaimer, the term of this patent is extended or adjusted under 35 U.S.C. 154(b) by 0 days.

(21) Appl. No.: 09/846,845

(22) Filed: May 1, 2001

(65) Prior Publication Data

US 2002/0192062 A1 Dec. 19, 2002

(51) Int. Cl.[7] .................................................. B60R 9/00
(52) U.S. Cl. ........................ 414/434; 414/438; 414/462; 414/469
(58) Field of Search .................................. 414/389, 434, 414/437, 438, 462, 467, 469, 551, 809, 812

(56) References Cited

U.S. PATENT DOCUMENTS

| 5,587 A | * | 5/1848 | Lyman et al. | 414/437 |
|---|---|---|---|---|
| 53,470 A | * | 3/1866 | Nanny | 212/251 |
| 538,627 A | * | 4/1895 | Shanks | 414/438 |
| 661,904 A | * | 11/1900 | Brown | 193/41 |
| 717,962 A | * | 1/1903 | Babbitt | 254/387 |
| 871,601 A | * | 11/1907 | Lauppe | 414/437 |
| 1,467,504 A | * | 9/1923 | Sabarros | 414/438 |
| 1,770,640 A | * | 7/1930 | Beasley | 414/438 |
| 4,674,933 A | * | 6/1987 | Brown | 224/402 |
| 5,911,556 A | * | 6/1999 | Caldwell | 224/401 |

* cited by examiner

Primary Examiner—James W. Keenan
(74) Attorney, Agent, or Firm—Wyatt, Tarrant & Combs, LLP

(57) ABSTRACT

An all terrain vehicle lifting apparatus includes a powered vehicle frame having a driver's seat, a plurality of wheels and a steering mechanism. At least one cargo rack is mounted on the frame at a position spaced away from the driver's seat. A mandrel is rotatably attached to the frame at the cargo rack. A load transfer member is attached to the mandrel, providing a free end portion that is attached to a cable. One end of the cable can be attached to an immovable object such as a tree. A lifting frame, preferably in the form of a pair of lifting rods, extends away from the mandrel at spaced apart positions, such as at the end portions of the mandrel. The cable is attached to a tree so that when the operator of the vehicle moves it forward, the load transfer rod is rotated and functions as a lever, rotating the mandrel and the lifting frame so that an animal carcass can be elevated for transport.

22 Claims, 5 Drawing Sheets

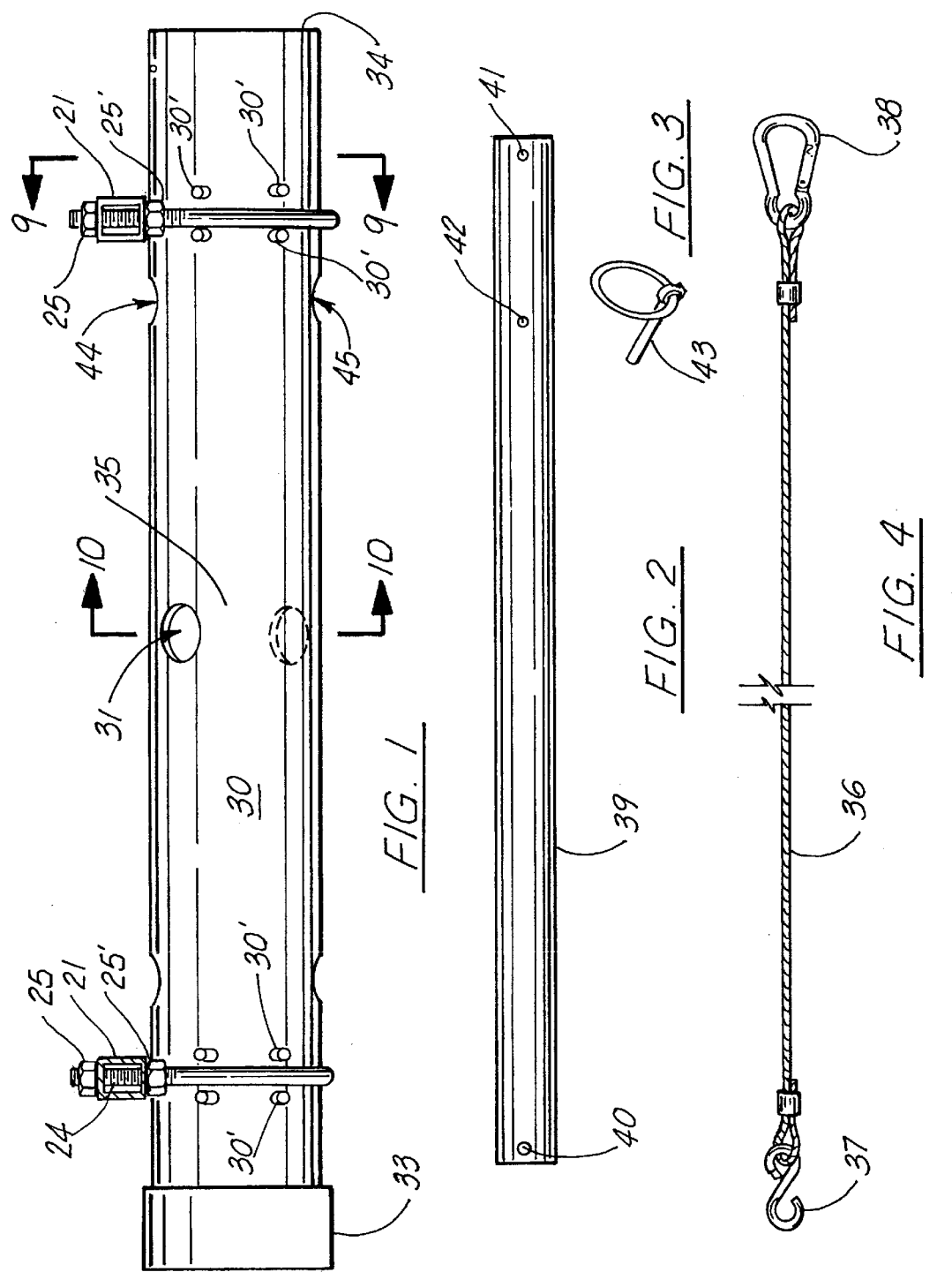

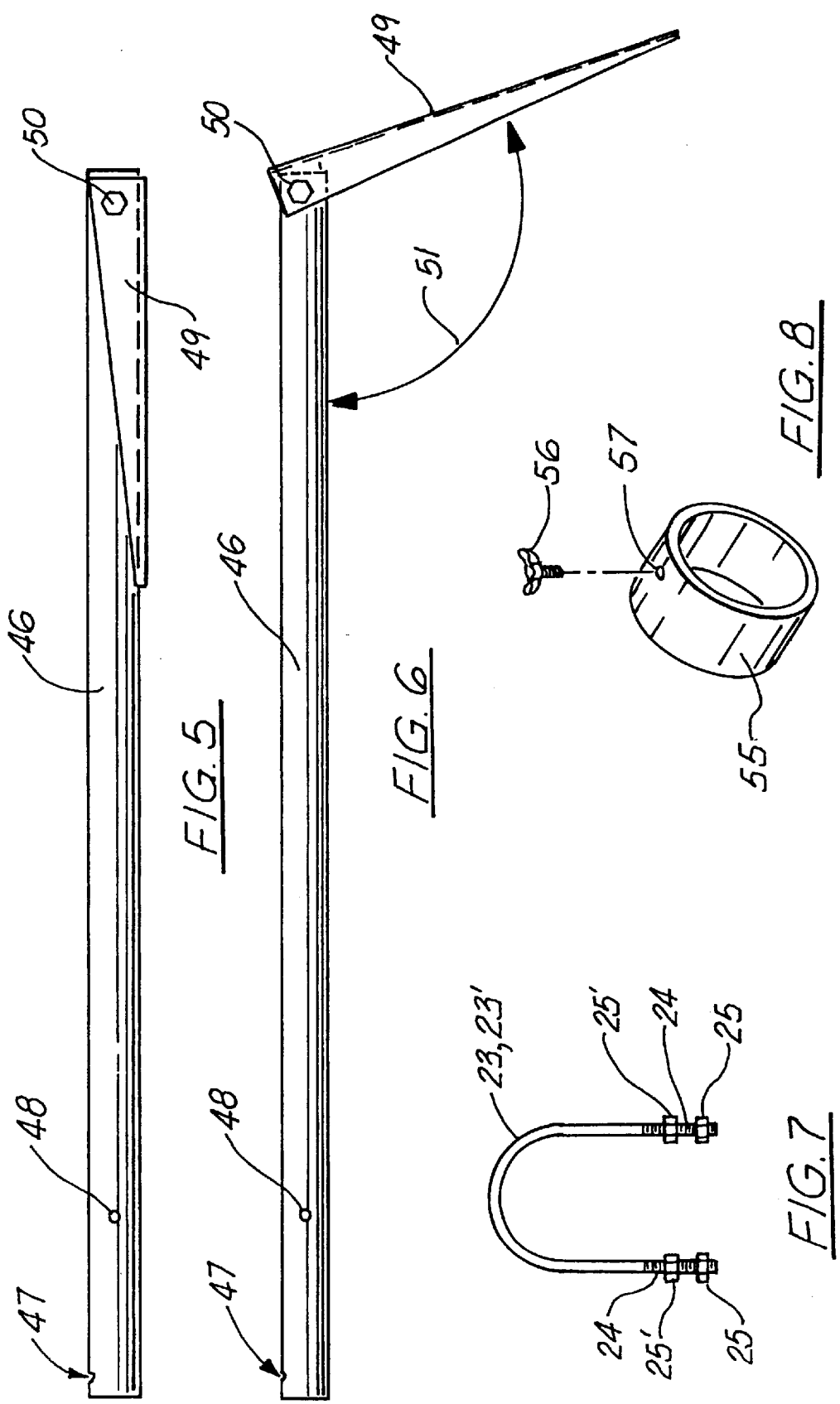

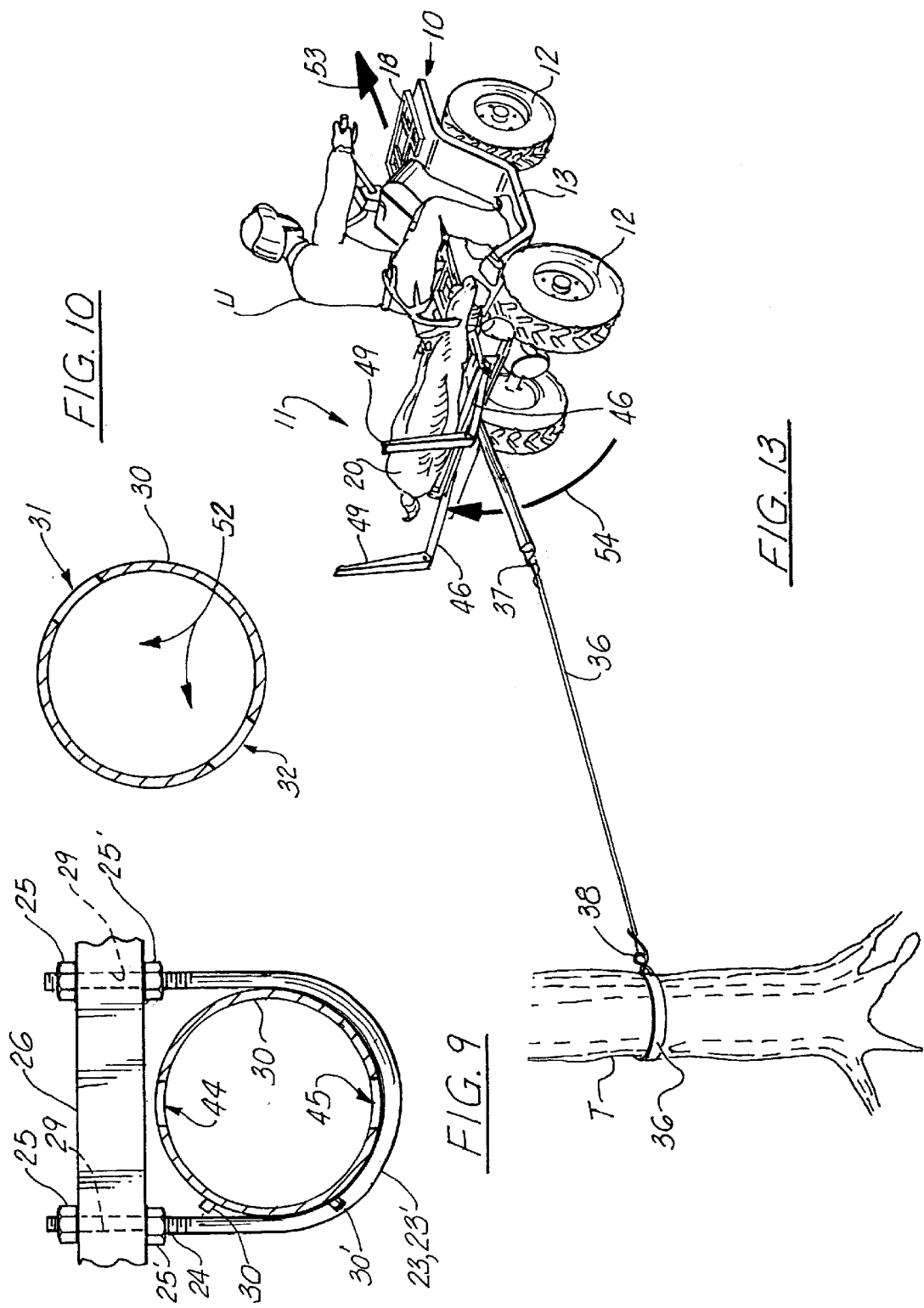

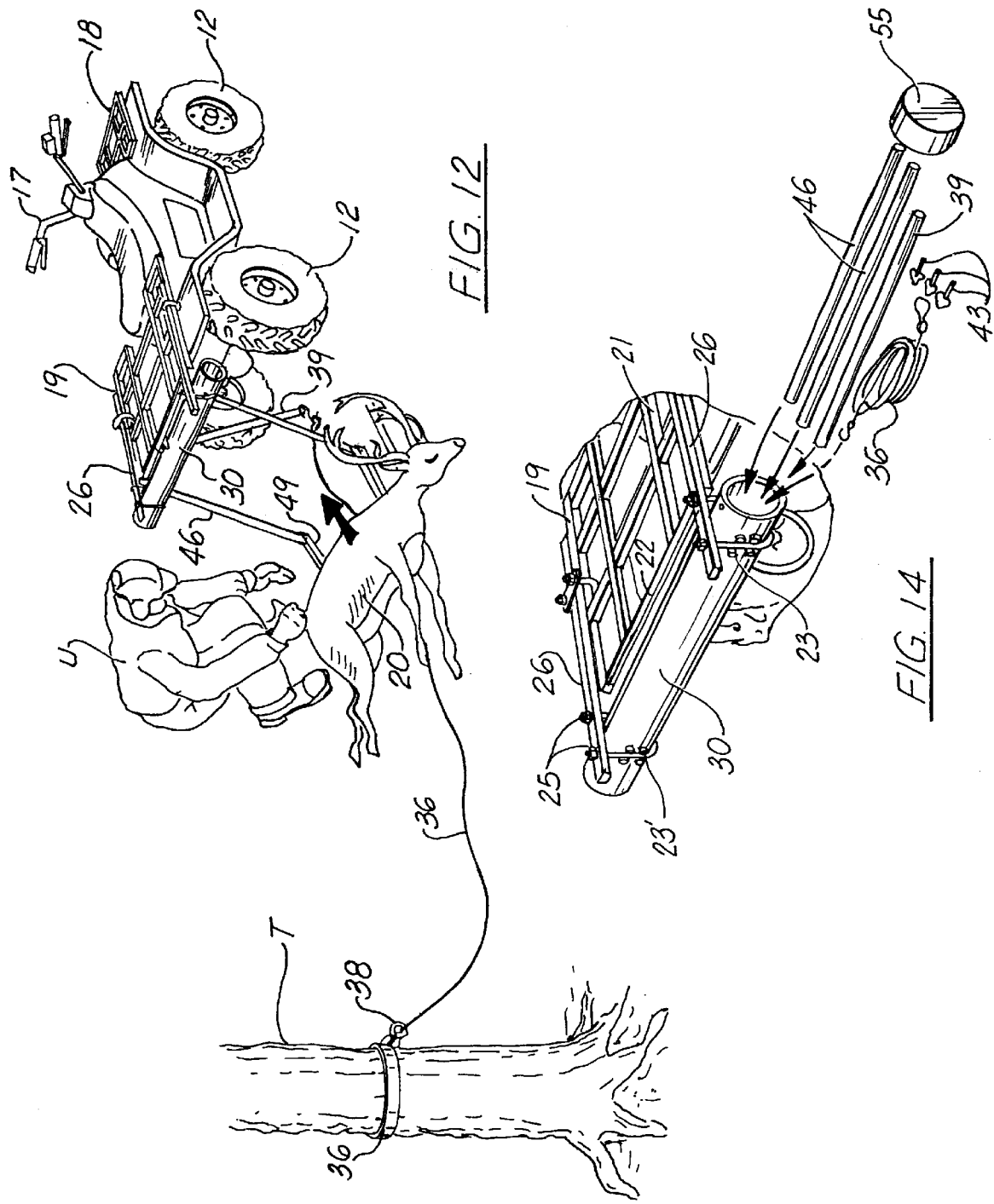

ALL TERRAIN VEHICLE LIFT

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to all terrain vehicles and more particularly to an improved all terrain vehicle lifting system that enables an animal carcass to be lifted from the ground to the vehicle for transport.

2. General Background of the Invention

Many hunters use all terrain vehicles to travel to and from their favorite destinations. Many hunters also use their all terrain vehicles to transport a game animal carcass from the woods to their cabin, automobile, or to a check station. For elderly hunters, hunters with medical problems, or in cases where the animal is very heavy, transporting the animal carcass presents a problem because the carcass must be elevated about 2½–3 feet to reach the all terrain vehicle cargo rack. This problem is especially acute if the animal carcass is a great distance away from other persons that might give assistance.

BRIEF SUMMARY OF THE INVENTION

The present invention provides an improved lift apparatus on an all terrain vehicle (ATV) wherein the ATV includes a powered vehicle frame having a driver's seat, a plurality of wheels, and a steering mechanism. The ATV vehicle frame normally provides a rear cargo racks mounted to the frame at a position spaced away from the driver's seat. Some ATV's also provide front cargo or special purpose racks. The lift apparatus of the present invention is normally mounted on the rear cargo rack since the rear rack is larger and positioned over the drive wheels of the ATV. Mounting on a front rack is feasible, however would require accommodation for the vehicle drive, center of gravity/weight distribution and rack configuration.

The present invention is directed to a lift which is conveniently mounted on the ATV rear cargo rack. The invention includes a mandrel removably attached to the frame at one of the selected cargo racks either directly or by means of universal mounting members, the mandrel being rotatable. The mandrel is preferably horizontally positioned.

A load transfer system is provided for rotating the mandrel relative to the vehicle frame cargo rack. The load transfer system is preferably in the form of a load transfer rod having a first end portion affixed to the mandrel and another end portion that is a free end to which a cable can be attached. A lifting frame is provided supporting and for elevating an animal carcass to be loaded. The lifting frame is preferably in the form of a pair of lifting rods that extend from the mandrel at respective spaced apart positions, such as at the left and right end portions of the mandrel.

A tensile load transfer member (e.g., cable or chain) is provided for forming a connection between the load transfer rod and an immovable object such as a tree. By anchoring the load transfer rod to the tree with a tensile member (e.g., cable or chain), the mandrel can be rotated simply by moving the vehicle frame forward and away from the tree. The cable pulls on the load transfer rod and rotates the mandrel which simultaneously rotates the pair of lifting rods and the supported animal carcass.

In the preferred embodiment, the mandrel is hollow and of sufficient diameter that the disassembled parts of the lift may be stored within the mandrel when not in use.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a partial rear view of an embodiment of the apparatus of the present invention;

FIG. 2 is a partial view of the preferred embodiment of the apparatus of the present invention showing the load transfer rod;

FIG. 3 is a fragmentary perspective view of the locking pin used with the preferred embodiment of the apparatus of the present invention;

FIG. 4 is a fragmentary view of a cable used with the preferred embodiment of the apparatus of the present invention;

FIG. 5 is a side view of the lifting rod portion of the preferred embodiment of the apparatus of the present invention shown in folded position;

FIG. 6 is a side view of the lifting rod portion of the preferred embodiment of the apparatus of the present invention shown in operating, lifting position;

FIG. 7 is a front view of the mandrel support portion of the preferred embodiment of the apparatus of the present invention;

FIG. 8 is a perspective view of the mandrel cap portion of the preferred embodiment of the apparatus of the present invention;

FIG. 9 is a sectional view taken along lines 9–9 of FIG. 1;

FIG. 10 is a sectional view taken along lines 10–10 of FIG. 1;

FIG. 12 is a perspective view of the embodiment of the apparatus of the present invention illustrated in FIG. 11 showing an animal carcass being loaded upon the lifting rod members; and FIG. 13 is a perspective view of the preferred embodiment of the apparatus of the present invention showing a lifting of the lifting rod members and a supported animal carcass to an elevated position.

FIG. 14 is a partial perspective view of the preferred embodiment of the apparatus of the present invention showing storage of the components of the lifting apparatus into the mandrel.

DETAILED DESCRIPTION OF THE INVENTION

Figure 11:
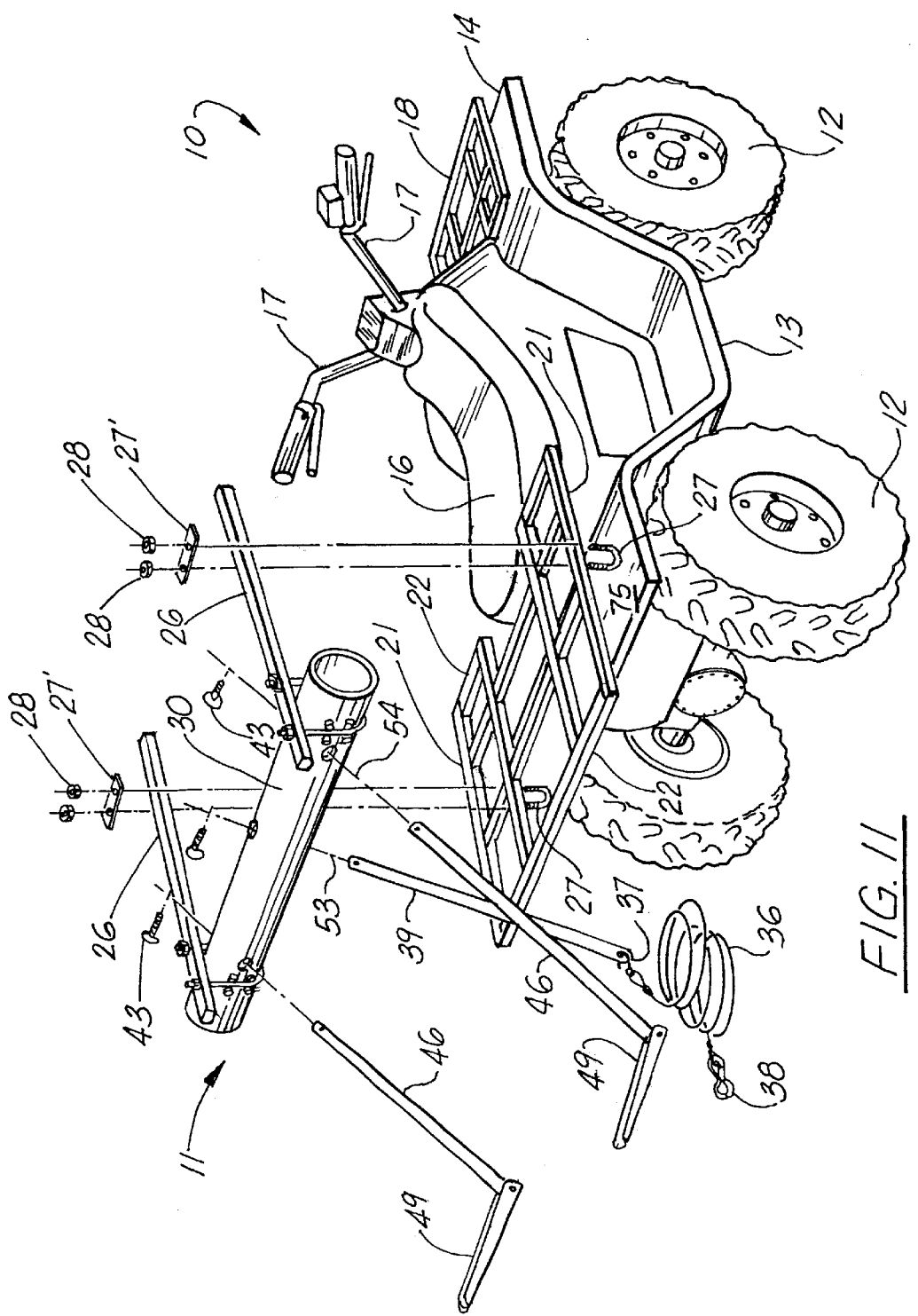
FIG. 11 is an exploded perspective view of another embodiment of the apparatus of the present invention.

FIGS. 1 through 10 illustrate the lift for an all terrain vehicle, according to the present invention. FIGS. 11–14 show the preferred embodiment of the apparatus of the present invention disposed on the ATV, designated generally by the numeral 10. All terrain vehicle lift 11 is removably attached to an all terrain vehicle 10 that has a frame or chassis 13 with a plurality of wheels 12, a forward end 14 having front cargo rack 18, and a rear end 15 having rear cargo rack 19. Seat 16 and handle bars 17 enable a human operator U to sit upon and steer the apparatus 10.

Many such all terrain vehicles are adapted for use by hunters that use the cargo racks 18, 19 to carry equipment and supplies. If a hunter is successful, the cargo racks 18, 19 (particularly rear cargo rack 19) are designed to carry the weight of a deer or other game animal carcass 20. Hunters that hunt alone may be unable to lift a deer carcass 20 to one of the elevated racks 18 or 19. A deer carcass 20 typically weighs between about one hundred and two hundred pounds or more.

The apparatus 11 of the present invention provides an all terrain vehicle lift apparatus that enables a single individual to load an animal carcass 20, weighing as much as hundreds of pounds, upon his or her vehicle for transport.

The apparatus 11 of the present invention includes a preferably tubular mandrel 30 that can be removably mounted to either the side longitudinal frame members 21 (FIG. 1) or the universal mounting bars 26 FIG. 11) using supports 23, 23'. Mandrel 30 has left 33 and right 34 end portions and central portion 35.

In FIGS. 9–14, mandrel 30 is attached to rear cargo rack 19 by means of mounting bars 26 using left support 23 and right support 23' received in openings 29 in mounting members 26. Each support 23,23' can be a U-bolt (see FIG. 7) having externally threaded portions 24 that accept nuts 25 (above) and nuts 25' (below) on mounting members 26 disposed on opposing sides of a longitudinal frame member 21 of cargo rack 19 as better shown in FIGS. 9, 11 through 14. If the apparatus 10 is part of the original equipment of the ATV, or manufactured for a particular model of ATV, supports 23,23' may be directly mounted to side bars 21 of rear cargo rack 19 provided they are adapted with openings 29 to receive supports 23, 23'.

On the universal embodiment of lift 11 illustrated in FIG. 11, rear cargo rack 19 is conventionally comprised of a plurality of structurally connected tubular members that typically include longitudinal frame members 21 and transverse frame members 22. Such cargo racks 18, 19 for all terrain vehicles are well known in the art. Mounting members 26 are attached to such as side members 21 by U-bolts 27, plates 27' and nuts 28 so as to overhang the rear portion of rear cargo rack 19 at the rear-most transverse member 22 (FIGS. 11, 14). Left and right supports 23, 23' are received in openings 29 and are bolted to mounting members 26 as subsequently described. In FIGS. 1 and 9, openings 29 in longitudinal member 21 and mounting member 26 receive support 23' on the right side of rear rack 19. Similarly, support 23 affixes to a longitudinal member 21 or mounting member 26 on the left side of rear rack 19. Nuts 25' are positioned below longitudinal member 21 or member 26 on each support 23, 23'. Nuts 25 are positioned above longitudinal member 21 or member 26 as shown in FIGS. 1 and 9. In this fashion, the nuts 25, 25' can be spaced to ensure that mandrel 30 is supported, but may also rotate during use. Additionally, mandrel 30 includes pins 30' disposed on the surface of mandrel 30 at distances corresponding to approximately the space between left and right supports 23, 23' such that in rotation of mandrel 30 in supports 23, 23', it will not travel axially and malfunction. Spacing of multiple pins 30' on mandrel 30 allows for supports 23, 23' to pe positioned on either sides of respective pins 30' to accommodate for variations in the lateral distance between longitudinal members 21 (and mounting members 26, mounted thereon) which may be observed in different models and manufacture of ATVs.

In order to load animal carcass 20, a user U secures mandrel 30 to rear 19 cargo rack as shown in FIGS. 1, 9 and 11. Load transfer rod 39 is then attached to mandrel 30 at openings 31, 32 near central portion 35.

Rod 39 is inserted through opening 31 and then through opening 32. Pin 42 acts as a stop to limit penetration of rod 39 through openings 31,32. Pin 42 and opening 41 are dimensioned apart the approximate external diameter of mandrel 30. A suitable locking pin 43 can be placed through opening 41 to secure rod 39 in openings 31,32. Similarly, the load transfer rods 46 removably attach to mandrel 30. In FIGS. 1, 4–6 and 10, a pair of openings 44, 45 are provided on both the left 33 and right 34 end portions of mandrel 30. Each lifting rod 46 has an opening 47 at one end portion opposite folding support 49. Pin 48 is spaced away from opening 49 a distance about equal to the outer diameter of mandrel 30. Each lifting rod 46 is secured to mandrel 30 by inserting rod 46 into openings 44, 45 and securing it with a suitable locking pin 43.

Once the rods 39, 46 are attached to mandrel 30 (see FIG. 12), a user U manually rotates the mandrel 30 so that the lifting rods 46 extend downwardly and at a slight angle to the vertical. Lifting rods 46 are a length of about 36 inches or more to ensure that, irrespective of the model or manufacturer, the height of rack 19 and mandrel 30 exceed the height of mandrel 30 above the ground, to ensure rods 46 and supports 49 rest on the ground to enable loading of a deer 20 or the like on lift 11. The animal carcass 20 is then placed upon the two folding supports 49 (see FIG. 12). Cable 36 is then attached to load transfer rod 39 at opening 40 using hook 37 or other connecting device. The opposite end of cable 36 is attached to a fixed object, such as tree T using cable shackle 38.

In order to lift the carcass 20 and transfer it to rear rack 19, the user U moves the all terrain vehicle 10 forward in the direction of arrow 53 (see FIG. 13). Cable 36 then rotates rod 39 in the direction of arrow 54. As rods 46 also rotate in the direction of arrow 54, carcass 20 is elevated.

In FIG. 13, when rod 39 is elevated to approaching a horizontal position, rods 46 are higher as shown, forming an inclined ramp that enables carcass 20 to be gently transferred by sliding it from rods 46 to rear rack 19. As an example, when rod 39 is generally horizontally positioned, rods 46 are inclined, forming an angle of about 20°–70° with rod 39.

In FIG. 14, the mandrel 30 bore 52 provides a cavity for storing rods 39, 46 and cable 36. Cap 55 closes bore 52, being secured thereto with bolt 56.

Parts List

The following is a list of suitable parts and materials for the various elements of the preferred embodiment of the present invention.

| Part No. | Description |
| --- | --- |
| 10 | all terrain vehicle lift apparatus |
| 11 | all terrain vehicle lift |
| 12 | wheel |

-continued

| Part No. | Description |
|---|---|
| 13 | frame |
| 14 | forward end |
| 15 | rear end |
| 16 | seat |
| 18 | front rack |
| 19 | rear rack |
| 20 | animal carcass |
| 21 | longitudinal frame member |
| 22 | transverse frame member |
| 23 | left support |
| 23' | right support |
| 24 | externally threaded portion |
| 25 | nut |
| 25' | nut |
| 26 | mounting member |
| 27 | U-bolt |
| 27' | plate |
| 28 | nut |
| 29 | opening |
| 30 | tubular mandrel |
| 30' | pins |
| 31 | opening |
| 32 | opening |
| 33 | left end portion |
| 34 | right end portion |
| 35 | central portion |
| 36 | cable |
| 37 | hook |
| 38 | shackle/carbine |
| 39 | load transfer rod |
| 40 | opening |
| 41 | opening |
| 42 | projection |
| 43 | locking pin |
| 44 | opening |
| 45 | opening |
| 46 | lifting rod |
| 47 | opening |
| 48 | projection |
| 49 | folding support |
| 50 | pivot |
| 51 | arrow |
| 52 | hollow bore |
| 53 | arrow |
| 54 | arrow |
| 55 | cap |
| 56 | bolt |
| 57 | opening |
| T | tree |
| U | user |

The foregoing embodiments are presented by way of example only; the scope of the present invention is to be limited only by the following claims.

What is claimed is:

1. An all terrain vehicle for hunting adapted with lifting apparatus for loading a game carcass on the vehicle comprising:
   a) a powered vehicle frame having a driver's seat, a plurality of wheels and a steering mechanism; and
   b) at least one cargo rack mounted on the frame at a position spaced away from the driver's seat;
   c) a mandrel rotatably attached to the frame at the cargo rack;
   d) a load transfer rod extending from the mandrel having first and second end portions, one end portion affixed to the mandrel, the other end portion being a free end;
   e) a pair of lifting rods extending from the mandrel at spaced apart positions, wherein the angle formed between said extending load transfer rod and the plane of the lifting rods forms an angle of from about 20° and about 70°; and
   f) a tensile load transfer member for connecting the load transfer rod to an immovable object at a position that enables rotation of the load transfer rod, mandrel and lifting rods in the same rotational direction to a position above the cargo rack when the vehicle moves in a direction that is away from the immovable object and the tensile load transfer member.

2. The all terrain vehicle of claim 1 wherein the tensile load transfer member is a cable.

3. The all terrain vehicle of claim 1 wherein the mandrel is hollow providing a bore.

4. The all terrain vehicle of claim 3 wherein each of the rods fit completely inside of the mandrel bore for storage.

5. The all terrain vehicle of claim 4 wherein the rods and tensile load transfer member fit completely inside the bore for storage.

6. The all terrain vehicle of claim 1 wherein the load transfer rod forms an acute angle with each of the lifting rods.

7. The all terrain vehicle of claim 1 wherein the cargo rack is mounted behind the driver's seat.

8. The all terrain vehicle of claim 1 wherein the mandrel is attached to rear of the cargo rack.

9. The all terrain vehicle of claim 1 wherein each lifting rod includes a smaller rod section that is extendable at an angle with respect to the lifting rod.

10. An all terrain vehicle for hunting adapted to load and carry a game carcass comprising:
    a powered vehicle frame having a driver's seat, wheels and a steering mechanism;
    at least one cargo rack mounted on the frame at a position spaced away from the driver's seat;
    a mandrel having a bore therethrough rotatably attached to the frame at the cargo rack;
    a load transfer member extending from the mandrel having first and second end portions, one end portion affixed to the mandrel, the other end portion being a free end;
    a lifting structure that extends radially from the mandrel, wherein the angle formed between said extending load transfer rod and the lifting structure forms an angle of from about 20° and about 70°; and
    a tensile load transfer member for connecting the load transfer member to an immoveable object at a position that rotates the load transfer member, mandrel and lifting structure in the same rotational direction to a position above the cargo rack when the vehicle is moved in a direction that is away from the immoveable object.

11. The all terrain vehicle of claim 10 wherein the tensile load transfer member is a cable.

12. The all terrain vehicle of claim 10 wherein the mandrel is hollow providing a bore.

13. The all terrain vehicle of claim 10 wherein the load transfer member forms an acute angle with the lifting structure.

14. The all terrain vehicle of claim 10 wherein the cargo rack is mounted behind the driver's seat.

15. The all terrain vehicle of claim 10 wherein the mandrel is attached to rear of the cargo rack.

16. The all terrain vehicle of claim 10 wherein the lifting structure includes a plurality of radially extending members.

17. The all terrain vehicle of claim 10 wherein each of the radially extending members fit completely inside of the mandrel bore for storage.

18. The all terrain vehicle of claim 17 wherein the radially extending members and tensile load transfer member fit completely inside the bore for storage.

19. The all terrain vehicle of claim 10 wherein the lifting structure includes a folding section.

20. A method of transferring an animal carcass load to an all terrain vehicle adapted for hunting that has a cargo rack, comprising the steps of:
  a) fitting a mandrel to the all terrain vehicle cargo rack so that the mandrel can rotate about a generally horizontal axis;
  b) attaching one or mere lifting members and a load transfer lever substantially perpendicular to the mandrel wherein the angle formed between said extending load transfer members and the load transfer lever rods forms an angle of from about 20° and about 70°;
  c) rotating the mandrel until the lifting member or members is lowered to a position next to the carcass;
  d) placing the carcass on the lifting members; and
  e) rotating the mandrel by applying a tensile force to the load transfer lever so that the lifting members elevate the carcass to a selected elevation above the cargo rack.

21. The method of claim 20 further comprising the step of transferring the carcass from the lifting member or members to the cargo rack.

22. The method of claim 20 wherein in step "e" the mandrel is rotated by anchoring the mandrel to a fixed object through the load transfer lever and by moving the vehicle so that the mandrel is rotated with the lever.

* * * * *